United States Patent [19]

Falk et al.

[11] Patent Number: 4,491,649

[45] Date of Patent: Jan. 1, 1985

[54] HIGH IMPACT POLYPHENYLENE ETHER COMPOSITIONS HAVING IMPROVED PROCESSABILITY

[75] Inventors: John C. Falk, Northbrook, Ill.; Ronald L. Jalbert, Parkersburg, W. Va.; Klementina F. Khait, Skokie, Ill.

[73] Assignee: Borg-Warner Chemicals, Inc., Parkersburg, W. Va.

[21] Appl. No.: 556,888

[22] Filed: Dec. 1, 1983

[51] Int. Cl.³ ............................................. C08L 53/00
[52] U.S. Cl. ....................................... 525/92; 525/67; 525/68; 525/146; 525/152; 525/905
[58] Field of Search ...................... 525/92, 905, 67, 68, 525/146, 152

[56] References Cited

U.S. PATENT DOCUMENTS

| | | | |
|---|---|---|---|
| 3,134,753 | 5/1964 | Kwiatek | 260/47 |
| 3,306,874 | 2/1967 | Hay | 260/47 |
| 3,356,761 | 12/1967 | Fox | 260/874 |
| 3,383,435 | 5/1968 | Cizek | 260/874 |
| 3,660,531 | 5/1972 | Lauchlan et al. | 260/876 B |
| 3,879,347 | 4/1975 | Serini et al. | 260/47 XA |
| 3,879,348 | 4/1975 | Serini et al. | 260/47 XA |
| 4,011,200 | 3/1977 | Yonemitsu et al. | 260/47 ET |
| 4,038,343 | 7/1977 | Yonemitsu et al. | 260/874 |
| 4,077,934 | 3/1978 | Lee, Jr. | 260/30.6 R |
| 4,102,854 | 7/1978 | Gergen et al. | 525/92 |
| 4,113,800 | 9/1978 | Lee, Jr. | 260/876 B |
| 4,167,507 | 9/1979 | Haaf | 525/92 |
| 4,374,233 | 2/1983 | Loucks et al. | 525/394 |

*Primary Examiner*—Jacob Ziegler
*Attorney, Agent, or Firm*—Richard J. Schlott

[57] ABSTRACT

Polyphenylene ether resins impact modified with a rubbery impact modifier such as an ABA block copolymer or a polyolefin is made more processable by further compounding with a moderate amount of an aromatic polycarbonate. The compositions exhibit markedly high impact strength and high heat distortion temperature characteristics.

8 Claims, No Drawings

HIGH IMPACT POLYPHENYLENE ETHER COMPOSITIONS HAVING IMPROVED PROCESSABILITY

BACKGROUND OF THE INVENTION

This invention relates to polyphenylene ether compositions and more particularly to impact-modified polyphenylene ether compositions having improved processability, and to a method for improving the processability of impact-modified polyphenylene ether compositions.

Polyphenylene ether (PPE) resins have long been known as high temperature thermoplastics. For example, PPO, or poly(2,6-dimethyl-1,4-phenylene ether) was disclosed and described in U.S. Pat. Nos. 3,134,753 and 3,306,874. More recently, in U.S. Pat. No. 4,011,200 phenylene ether copolymer resins having improved thermal stability were described. PPE resins generally soften or melt only at very high temperatures and are very difficult to melt process in conventional molding equipment. Commonly, PPE resins are blended with lower melt temperature resins to improve their melt processability and to achieve commercially acceptable molding characteristics. For example, blends of polyphenylene ether resins with styrenic resins such as those shown in U.S. Pat. Nos. 3,356,761, 3,383,435 and 4,038,543 are considerably more readily processable than PPE resins alone, and have found substantial commercial application as molding resins. Although blends of polyphenylene ether resins with lower melt temperature styrenic resins may be formulated to have good mechanical properties and are much improved in processability over the polyphenylene ether resins alone, such blends generally exhibit a significantly lowered heat distortion temperature compared with that of the corresponding PPE resin. Consequently, the upper use temperature limits for these blends is reduced below that of polyphenylene ether resins alone.

Blends of poly(2,6-disubstituted)phenylene ether resins, and particularly PPO, with a variety of rubbery impact modifiers have also been disclosed in the art. For example, high impact blends of PPO containing greater than 30 wt% of a combination of block copolymer rubbers were disclosed in U.S. Pat. No. 4,113,800. In U.S. Pat. No. 4,167,507 there are disclosed impact modified blends of PPO and a hydrogenated ABA block copolymer rubber. These latter blends include a plasticizer and a styrenic resin to achieve processability, which in turn substantially depress the HDT value of these resin blends. In U.S. Pat. No. 3,660,531, rubber modified blends of PPO are shown to have greatly enhanced processability when a styrenic resin is included. Again, the including of a styrenic resin and/or a plasticizer substantially reduces the HDT value for such blends and limits their upper end-use temperature properties.

The market place continues to find a need for processable high impact thermoplastic resins with a good balance of mechanical properties and even higher end-use temperature performance, demands which are not satisfactorily met by the presently available resin compositions.

SUMMARY OF THE INVENTION

This invention is an improved impact-modified thermoplastic polyphenylene ether blend having improved processability, comprising a polyphenylene ether, a rubbery impact modifier and an aromatic polycarbonate. The blends exhibit excellent high temperature performance and impact properties, and achieve good melt processing characteristics without a substantial decrease in heat distortion temperature values.

DETAILED DESCRIPTION OF THE INVENTION

The compositions of this invention comprise 100 parts by weight of an impact modified PPE and from 5 to 25 parts by weight of an aromatic polycarbonate. The impact modified PPE comprises a thermoplastic blend of from 95 to 75 wt% of a polyphenylene ether resin and from 5 to 25 wt% of a rubbery impact modifier. The aromatic polycarbonate serves as an aid to melt processability without greatly reducing the HDT values of the impact modified PPE.

The polyphenylene ether resins useful for the purposes of this invention include both the homopolymers prepared by oxidative coupling of a 2,6-dialkyl phenol as disclosed for example in U.S. Pat. No. 3,306,874 as well as the copolymers of 2,6-dialkyl phenols and 2,3,6-trialkyl phenols, described in U.S. Pat. No. 4,011,200. In general, the polymers are prepared by oxidative coupling of a 2,6-dialkyl phenol such as 2,6-dimethyl phenol or a mixture of a 2,6-dialkyl phenol and a 2,3,6-trialkyl phenol such as 2,3,6-trimethyl phenol. In forming copolymers suitable for the practice of this invention, the proportion of 2,3,6-trialkyl phenol will lie in the range of from about 2 to 50 wt% based on total polyphenylene ether. However, the preferred copolymers will comprise from about 2 to 20, more preferably from about 2 to 10 wt% 2,3,6-trialkyl phenol and correspondingly from about 98 to about 80, more preferably from about 98 to about 90 wt% 2,6-dialkyl phenol. The synthesis of these homopolymers and copolymers by a variety of oxidative coupling processes is well known in the art, and such polymers have become available to the art from commercial sources.

The rubbery impact modifiers useful in the practice of this invention are those used in the art alone or in combination to impact-modify PPE resins and include a wide variety of diene rubbers, polyolefins, and ABA block copolymer rubbers. For example, ABA block copolymers are useful as impact modifiers in the practice of this invention, including those described in U.S. Pat. No. 3,431,323. In general, these block copolymers are copolymers having end blocks A formed of vinyl aromatic hydrocarbon monomer such as for example styrene, vinyl toluene, alphamethyl styrene or mixtures thereof and a center block formed of a 1,3-diene such as 1,3-butadiene, isoprene or the like. The ABA block copolymers may be hydrogenated to reduce the ethylenic unsaturation to less than 10% of the original value. The unhydrogenated ABA block copolymers are also useful as impact modifiers for PPE resins in the practice of this invention. The ratio of A and B units and the molecular weights of the ABA block copolymers may be varied widely, however the A blocks will preferably comprise from 2–23% by weight of the total block polymer. These block polymers are widely available commercially both in hydrogenated and unhydrogenated form, particularly as the Kraton-G series of hydrogenated ABA block copolymers as well as the unhydrogenated Kraton ABA block copolymer elastomers from Shell Chemical Company. Other rubbery impact modifiers known to be useful for the impact modification of PPE resins and therefore useful in the practice of this invention include radical block styrene-1,3-diene copolymers and high-rubber graft copolymers, as well as polyolefins such as for example polyethylene, polybutene rubbers, ethylene-propylene copolymers and terpolymers and the like.

The aromatic polycarbonate resins useful as a melt processing aid in the practice of this invention are also well known in the art and include resins such as those set forth in U.S. Pat. Nos. 2,999,835, 3,879,347 and 3,879,348. In general, the polycarbonate resins may be described as being prepared by reacting a carbonate precursor such as phosgene with unhindered or hindered dihydric phenols, as well as mixtures thereof. The unhindered dihydric phenols may be more particularly described as bis(4-hydroxyphenyl)alkanes such as, for example 2,2-bis(4-hydroxyphenyl)propane (bisphenol A), 2,2-bis(4-hydroxyphenyl)butane (bisphenol B), 1,1-bis(4-hydroxyphenyl)cyclohexane (bisphenol C), bis(4-hydroxyphenyl)methane (bisphenol F), bis(4-hydroxyphenyl)phenyl methane and the like, as well as mixtures thereof. The unhindered dihydric phenol carbonate resins are widely available commercially in a variety of extrusion and molding grades.

The hindered dihydric phenols include bis(3,5-dialkyl-4-hydroxyphenyl)alkanes such as for example 2,2-bis(3,5-dimethyl-4-hydroxyphenyl)propane, 2,2-bis(3,5-diethyl-4-hydroxyphenyl)propane, 2,2-bis(3,5-diisopropyl-4-hydroxyphenyl)propane and the like. The preparation of the corresponding carbonate homopolymers is disclosed in U.S. Pat. No. 3,879,348, while typical copolymers are set forth in U.S. Pat. No. 3,879,347.

The compositions of this invention will comprise 100 parts by weight of a blend of a polyphenylene ether and a rubbery impact modifier and from 5 to 25 parts by weight of an aromatic polycarbonate. The blend will comprise from 98 to 75 wt% of the polyphenylene ether and from 2 to 25 wt% rubbery impact modifier.

The compositions of this invention may be prepared by any of a variety of methods well known in the art. For example, the resins may be dissolved in suitable solvents, the resulting solutions mixed in the desired proportions, and the resin mixture isolated by coagulation or by removing the solvent by evaporation or stripping. Alternatively, an intimate mixture of the powdered resins may be prepared by a dry-blending technique and then compression molded. Thermal processing in a melt mixing device such as a Banbury mixer, a heated roll mill or an extruder may be used to provide a resin blend which then may be chopped or ground into particles and fed to an injection molding machine, provided that thorough melt mixing is accomplished.

Complete and thorough mixing of the resin components is essential to attaining good physical properties. The aromatic polycarbonate component of the compositions of this invention appears to serve to increase the melt processability of the PPE resin component, improving the rapidity of mixing of the PPE resin with the rubbery impact modifier and resulting in a more complete and uniform mixing of the components. The preferred method of melt-mixing the compositions of this invention, particularly when employing such devices as Banbury mixers, Brabender laboratory mixing heads or single-screw extruders, will thus be a sequential process wherein the PPE resin and polycarbonate resin components will first be thoroughly melt-mixed or fluxed before the addition of the rubbery impact modifier. This preferred process may be accomplished in a variety of ways, including first melt-fluxing the PPE resin alone, then adding the polycarbonate resin, melt-mixing the two component blend, and finally adding the rubbery impact modifier to the melt and completing the melt-mixing. The use of sequential extrusions or a two-stage extruder for such mixing processes will be apparent to those skilled in the art.

The compositions are useful as high impact extrusion and molding resins. The blends may further comprise flame retardants, anti-oxidants, stabilizers, pigments, dyes, fillers, reinforcing fibers, plasticizers and processing aids as is well known in the resin molding art.

The compositions of this invention will be better understood by consideration of the following examples. These examples are not offered in limitation of the invention but rather in illustration of the preferred embodiments.

In the examples, the following abbreviations and terms are employed:

PEC=copolymer of 2,6-dimethylphenol (95%) and 2,3,6-trimethylphenol (5%).

PC=polycarbonate of 2,2-bis(4-hydroxyphenyl) propane, obtained as Lexan 105 from General Electric Company.

MPC=polycarbonate of 2,2-bis(3,5-dimethyl-4-hydroxyphenyl)propane, prepared substantially by the process of U.S. Pat. No. 3,879,348.

PPO=homopolymer of 2,6-dimethylphenol, obtained from Aldrich Chemical Co.

HDT=deflection temperature at 264 psi, ASTM D668.

Impact=Izod impact, ft lbs/in notch, ASTM D256A; unnotch values obtained on specimens without notch, ave. of 5 samples except where indicated by ( ).

Rubber=Rubbery impact modifier; examples of Tables I-III employ hydrogenated styrene-butadiene-styrene block copolymer, obtained as Kraton G from Shell Chemical Co. Examples of Table IV employ alternate impact modifiers as shown.

In the examples, blends of the indicated PPE resin, rubbery impact modifier and aromatic polycarbonate were prepared by melt blending or by solution blending where necessary. The processes used were generally as follows:

MELT-BLENDING

Blends were prepared in a Brabender mixing head by first fluxing the polyphenylene ether at 550°–560° F., then adding the requisite amounts of first the aromatic polycarbonate and then the impact modifier, and mixing at 550° F. for 7 min. The blends were then removed from the Brabender mixer, cooled to room temperature, chopped and fed to a two-roll mill. The blends were then milled at 530°–550° F. for 5 to 6 min., sheeted out, diced and compression molded at 560°–570° F. for 6–7 min. to form test specimens.

SOLUTION BLENDING

Solution blends were prepared by mixing 4.35 wt% solutions of the respective resins in chloroform solvent, coagulating the blend with 10 volumes of methanol, collecting the coagulated resin and drying at 100° C. for 16 to 24 hrs. The dried resin blends were then milled at 560° F. for 5 to 6 min. on a two-roll mill, cooled, diced and compression molded at 560° F. for 7 min.

EXAMPLES 1–8

In Examples 1 and 3–8, blends of the indicated PPE resin, rubbery impact modifier (Kraton G) and aromatic polycarbonate (Lexan 105) were prepared and molded by the melt-blending procedure described above. The various formulations are summarized together with their impact and heat distortion properties in Table I. Control Examples A and C-E were prepared substantially by the melt process. Control Examples B And Example 2 were prepared by the solution blending process.

TABLE I

| Ex No | PPE type | PPE pbw | Rubber pbw | PC phr | HDT °C. | IMPACT notch | IMPACT unnotch |
|---|---|---|---|---|---|---|---|
| A | PEC | 100 | 0 | 0 | 195 | 1.0 | 49 |
| B | *PEC | 90 | 10 | 0 | 193 | 1.1 | 45 |
| C | PEC | 80 | 20 | 0 | 190 | 0.5 | 7.0 |
| 1 | PEC | 94 | 6 | 11 | 188 | 1.0 | 15 |
| 2 | *PEC | 89 | 11 | 5 | 185 | 8.5 | 28 |
| 3 | PEC | 89 | 11 | 11 | 183 | 5.0 | 20 |
| 4 | PEC | 89 | 11 | 22 | 179 | 1.1 | 12 (4) |
| 5 | PEC | 84 | 16 | 21 | 165 | 2.5 | 14 (4) |
| 6 | PEC | 83 | 17 | 83 | 140 | 2.0 | 37 (4) |
| D | PPO | 100 | 0 | 0 | 191 | 0.8 | 37 |
| E | PPO | 80 | 20 | 0 | 185 | <0.5 | 5.5 |
| 7 | PPO | 88 | 12 | 25 | 180 | 0.8 | 20 |
| 8 | PPO | 84 | 16 | 21 | 167 | 1.5 | 37 (3) |

Notes:
For definitions, see text. All compositions are melt-blended except * blends, which were solution-blended; see text.

In the melt-blending of Examples 1 and 3-8, it was observed that by first completely fluxing the polyphenylene ether resin, then adding the polycarbonate and fluxing the two-component mixture, and then finally adding the rubbery impact modifier and completing the melt-mixing, a rapid and completely uniform blend was obtained without observable degradation. The apparent melt-viscosity of the two-component PPE-polycarbonate mixture was observed to be lower, permitting ready dispersion of the impact modifier in the final blending step. When the aromatic polycarbonate and rubbery impact modifier were added simultaneously to the fluxed PPE resin in the Brabender mixing head, extended mixing was required to obtain a uniform melt blend.

By way of comparison, the direct addition of rubbery impact modifier to the fluxed PPE resin in the Brabender mixing head did not result in a uniform blend. An attempt to prepare a composition equivalent to Control B by first fluxing 90 pbw PPE at 560° F., then adding 10 pbw rubbery impact modifier was completely unsuccessful. The impact modifier could not be dispersed in the PPE melt even with extended mixing, and the mixture degraded, becoming an intractable crumb. Melt-blending of Control Examples C and E was somewhat more successful, the higher level of styrenic impact modifier contributing to reducing the apparent melt viscosity and thus improving the mixing character of the PPE resin melt. However, extended mixing times were required for these latter compositions, and degradation was difficult to avoid. It will thus be apprent that the addition of moderate amounts of an aromatic polycarbonate to a PPE resin permits the ready incorporation of rubbery impact modifiers and allows the preparation of uniform impact modified PPE resin blends.

In U.S. Pat. No. 4,077,934 there is disclosed an improved process for incorporating impact modified polystyrene into polyphenylene oxide resin by first preblending the PPO resin with a plasticizer such as triphenylphosphate or the like to lower the melt temperature of the PPO resin component. As is well known, such techniques also substantially lower the HDT value for such blends. As will be seen from the HDT values for the compositions of this invention as summarized in Table I, the addition of moderate amounts of an aromatic polycarbonate serves to improve the processability of PPE resins without severely depressing the heat distortion temperature values for the resulting blends.

Incorporating as little as 5 pbw of an aromatic polycarbonate into a blend comprising a PPE and a rubbery impact modifier results in a surprising increase in notched impact properties with little decrease in heat distortion temperature value. (Compare Control B with Example 2) The Control B example, a solution blend of 90 wt% PPE and 10 wt% ABA block copolymer, could not be directly prepared by melt processing; Example 2 was similarly prepared by solution blending for direct comparison. Melt-blended Examples 3 and 4, having 11 and 22 pbw aromatic polycarbonate, respectively, further demonstrate the impact improvement, as do melt-blended Examples 5-8 when compared with their respective Control Examples C and E.

While not wishing to be bound by any particular theory of operation, it appears that the addition of moderate amounts of a polycarbonate to impact-modified PPE resins unexpectedly enhances the effectiveness of the impact modifier and reduces somewhat the notch sensitivity characteristics of the resulting blends.

Although blends at all levels of aromatic polycarbonate exhibit useful properties, it will be seen that both the HDT values and notched impact properties of such blends begin to decrease as the polycarbonate level is increased above about 25 parts by weight, and such compositions are not preferred. Compare Examples 2 and 3 with 4, and Example 5 with 6. It will also be apparent that as with any multi-component blend, the balance of properties desired for a particular end-use will in part dictate the relative proportion of each component. Thus, where a higher level of rubbery impact modifier is employed, lower amounts of aromatic polycarbonate may be used to provide good processability without reducing impact properties.

EXAMPLES 9-23

In the following Examples, 9-18, summarized in Table II, blends of PEC polyphenylene ether copolymer resin, Kraton G hydrogenated ABA block copolymer resin and MPC, a high temperature aromatic polycarbonate of 2,2-bis(3,5-dimethyl-4-hydroxyphenyl)-propane were prepared, milled and molded substantially by the solution blending process set forth above. Similarly, blends of PPO polyphenylene oxide resin, Kraton G hydrogenated ABA block copolymer resin and MPC were prepared, milled and molded substantially by the same solution blending process. The formulations and physical properties are summarized in Table III.

TABLE II

| Ex No | PEC pbw | Rubber pbw | MPC phr | HDT °C. | IMPACT notch | IMPACT unnotch |
|---|---|---|---|---|---|---|
| 9 | 94 | 6 | 24 | 187 | 2.0 | 62 (4) |
| 10 | 89 | 11 | 11 | 196 | 9.6 | 32 |
| 11 | 89 | 11 | 22 | 185 | 6.0 | 42 (4) |
| 12 | 91 | 9 | 91 | 183 | 1.0 | 21 |
| 13 | 84 | 16 | 5 | 180 | 9.2 | 30 |
| 14 | 84 | 16 | 21 | 183 | 9.0 | 44 (4) |
| 15 | 83 | 17 | 83 | 184 | 3.0 | 20 |
| 16 | 80 | 20 | 5 | 179 | 10.2 | 30 |
| 17 | 80 | 20 | 320 | 181 | 2.0 | 13 |

TABLE II-continued

| Ex No | PEC pbw | Rubber pbw | MPC phr | HDT °C. | IMPACT notch | IMPACT unnotch |
|---|---|---|---|---|---|---|
| 18 | 77 | 23 | 77 | 174 | 5.0 | 36 |

Notes:
For term definitions, see text. All compositions are solution-blended; see text.

TABLE III

| Ex No | PPO pbw | Rubber pbw | MPC phr | HDT °C. | IMPACT notch | IMPACT unnotch |
|---|---|---|---|---|---|---|
| 19 | 94 | 6 | 24 | 188 | 2.2 | 33 (3) |
| 20 | 89 | 11 | 22 | 181 | 4.7 | 21 |
| 21 | 91 | 9 | 91 | 176 | 1.5 | 7.5 |
| 22 | 84 | 16 | 21 | 175 | 7.3 | 39 (3) |
| 23 | 83 | 17 | 83 | 173 | 3.0 | 19 |

Notes:
For term definitions, see text. All compositions are solution-blended; see text.

As with the impact-modified PPE compositions containing Lexan 105 polycarbonate of Table I, the addition of MPC aromatic polycarbonate improves the melt processing characteristics of impact modified PEC (Table II) and impact modified PPO (Table III) while sharply and surprisingly improving the notched impact properties of the impact modified PPE resins. The compositions of Examples 9-23 are readily injection molded and extruded on twin screw machines. A composition equivalent to Example 14 was also readily prepared in a Brabender mixing head at 550°-560° F. by the procedure outlined above without difficulty. For a particular level of impact modifier, the further addition of polycarbonate beyond a level of about 25 pbw reduces the notched impact value of the composition. Compare Example 10 with Examples 11 and 12, Example 13 with 14 and 15, Example 16 with 17, Example 20 with 21, and Example 22 with 23. MPC polycarbonate resin is a higher melt temperature resin than Lexan 105, hence the HDT value for the resulting blends is less quickly depressed for compositions containing MPC resin. It is none-the-less surprising that impact-modified PEC copolymer blends tolerate very much larger amounts of MPC than do impact-modified PPO homopolymer blends without depressing the HDT value below 180° C. Compare Example 17 with Examples 21-23.

It will thus be apparent that the relative proportions of PPE resin, impact modifier and aromatic polycarbonate resin will be selected with a view toward the particular end-use envisioned, and will depend in part upon the particular PPE resin, impact modifier and aromatic polycarbonate employed.

EXAMPLES 24-28

The processability of PPE resins impact-modified with other rubbery modifiers is also improved by incorporating moderate amounts of an aromatic polycarbonate. In the following Examples 24-28, blends of impact modified PEC using a variety of impact modifiers were prepared substantially by the solution blending process. The formulations and physical properties for molded specimens of these compositions are summarized in Table IV.

TABLE IV

| Ex No | PEC pbw | Rubber Type | Rubber pbw | PC phr | HDT °C. | IMPACT notch | IMPACT unnotch |
|---|---|---|---|---|---|---|---|
| 24 | 90 | KrD | 10 | 0 | 190 | 2.2 | 12 |
| 25 | 89 | KrD | 11 | 11 | 174 | 1.6 | 39 |
| 26 | 95 | PE | 5 | 0 | 195 | 2.1 | 11 |
| 27 | 94.4 | PE | 5.6 | 11 | 190 | 2.2 | 33 |
| 28 | 97.8 | PE | 2.2 | 11 | 196 | 1.3 | 40 |

Notes:
Rubber type KrD = Kration 1101 styrene-butadiene-styrene obtained from Shell Chemical Co.
Rubber type PE = Polyethylene, obtained as Microthene FN 510 from Allied Chemical Co.
Examples 24 and 25 were prepared by solution blending; Examples 26-28 were prepared by melt-mixing; see text.

The invention will thus be seen to be a thermoplastic resin composition comprising 100 parts by weight of a blend of a polyphenylene ether and a rubbery impact modifier and from 5 to 25 parts by weight of an aromatic polycarbonate, and a method for improving the melt processability of impact-modified polyphenylene ether blends comprising including an aromatic polycarbonate. Although the blends exhibit useful properties and improved processability over the entire range of PPE, impact modifier and polycarbonate ratios, those exhibiting a high level of toughness, reduced notch sensitivity and high heat distortion values and therefore more preferred are the blends comprising from 2 to 25 wt% of the rubbery impact modifier component and correspondingly from 98 to 75 wt% of the polyphenylene ether component.

We claim:

1. A thermoplastic resin comprising:
   100 parts by weight of a blend consisting of from 98 to 75 wt% of a polyphenylene ether and correspondingly from 2 to 25 wt% of a rubbery impact modifier; and
   from 5 to 50 parts by weight of an aromatic polycarbonate per hundred parts of said blend.

2. The composition of claim 1 wherein said polyphenylene ether is selected from the group consisting of homopolymers of 2,6-dialkylphenols and copolymers of 2,6-dialkylphenols and 2,3,6-trialkylphenols.

3. The composition of claim 1 wherein the aromatic polycarbonate is selected from the group consisting of carbonate polymers of 2,2-bis(4-hydroxyphenyl)propane, carbonate polymers of 2,2-bis(3,5-dimethyl-4-hydroxyphenyl)propane and copolymers thereof.

4. The composition of claim 1 wherein the rubbery impact modifier is selected from the group consisting of styrene-butadiene-styrene block copolymers, hydrogenated styrene-butadiene-styrene block copolymers, polyolefins, and mixtures thereof.

5. A thermoplastic resin composition comprising:
   (a) 100 parts by weight of a blend consisting of from 98 to 75 wt% of a polyphenylene ether selected from the group consisting of homopolymers of 2,6-dialkylphenols and copolymers of 2,6-dialkylphenols and 2,3,6-trialkylphenols and from 2 to 25 wt% of a rubbery impact modifier selected from the group consisting of styrene-butadiene-styrene block copolymers, hydrogenated styrene-butadiene-styrene block copolymers, polyolefins and mixtures thereof; and
   (b) from 5 to 25 parts by weight of an aromatic polycarbonate selected from the group consisting of carbonate polymers of 2,2-bis(4-hydroxyphenyl)propane, carbonate polymers of 2,2-bis(3,5-dimethyl-4-hydroxyphenyl)propane and copolymers thereof per hundred parts of said blend.

6. The composition of claim 5 wherein said rubbery impact modifier is a hydrogenated styrene-butadienes-tyrene block copolymer.

7. A method for improving the melt processability of a thermoplastic resin comprising 100 parts by weight of a blend consisting of from 98 to 75 wt% of a polyphenylene ether and correspondingly from 2 to 25 wt% of a rubbery impact modifier, said method comprising the step of including from 5 to 20 parts by weight, per hundred parts of said blend, of an aromatic polycarbonate.

8. A method according to claim 7 comprising the steps of:
first combining the polyphenylene ether resin with the aromatic polycarbonate resin under melt-processing conditions to form a preblend, and
thereafter combining said preblend under melt-processing conditions with the rubbery impact modifier.

* * * * *